Figure 1:
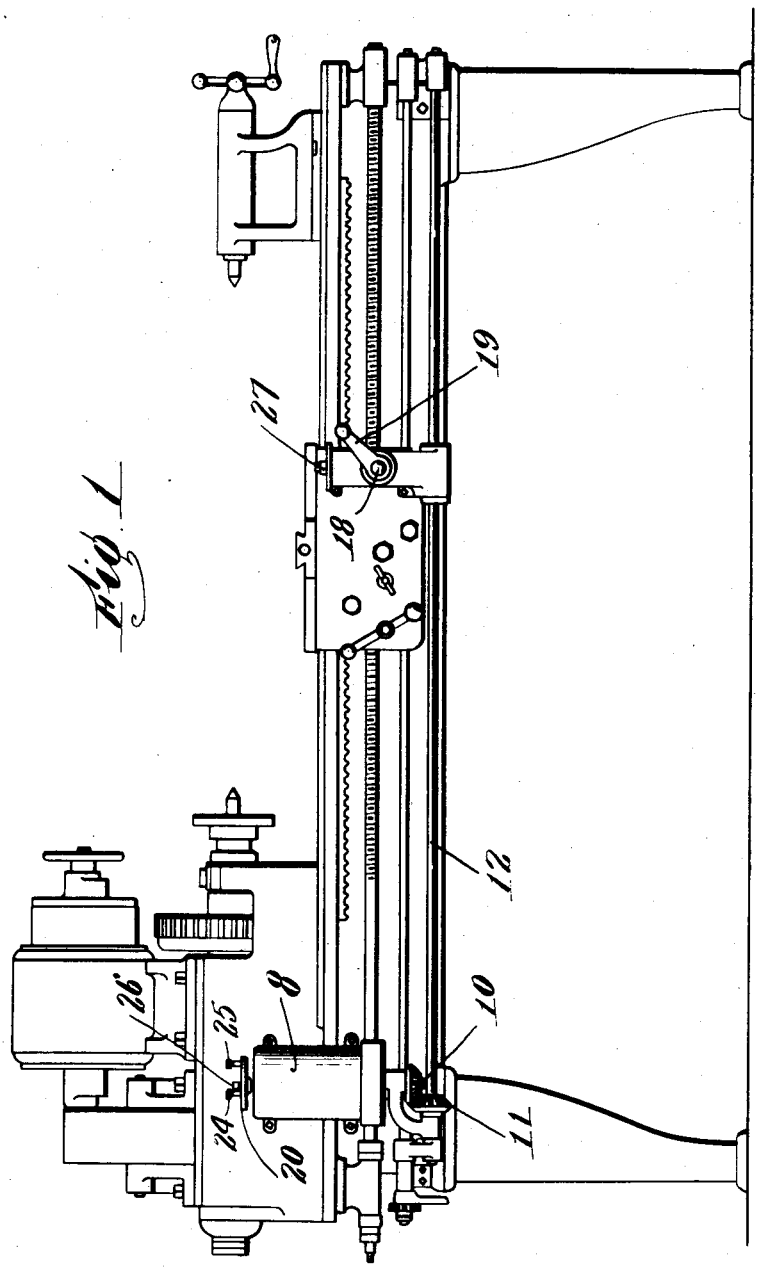

No. 871,199. PATENTED NOV. 19, 1907.
J. R. BACK.
CONTROLLER FOR ELECTRICALLY OPERATED MACHINE TOOLS.
APPLICATION FILED MAY 1, 1906. RENEWED SEPT. 30, 1907.

3 SHEETS—SHEET 1.

Witnesses:
C. F. Werson
E. M. Allen

Inventor:
J. R. Back
By Attorneys
Southgate & Southgate

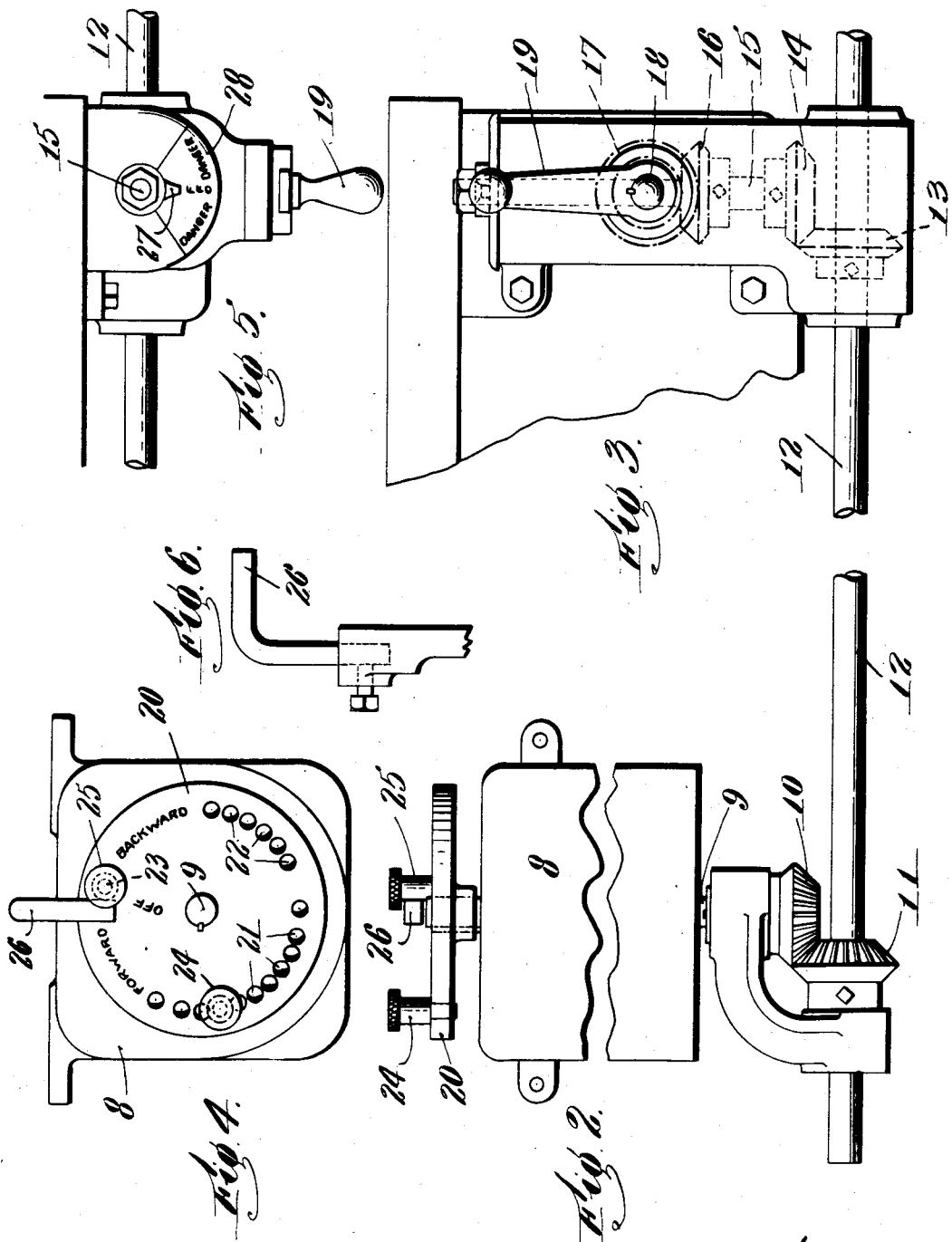

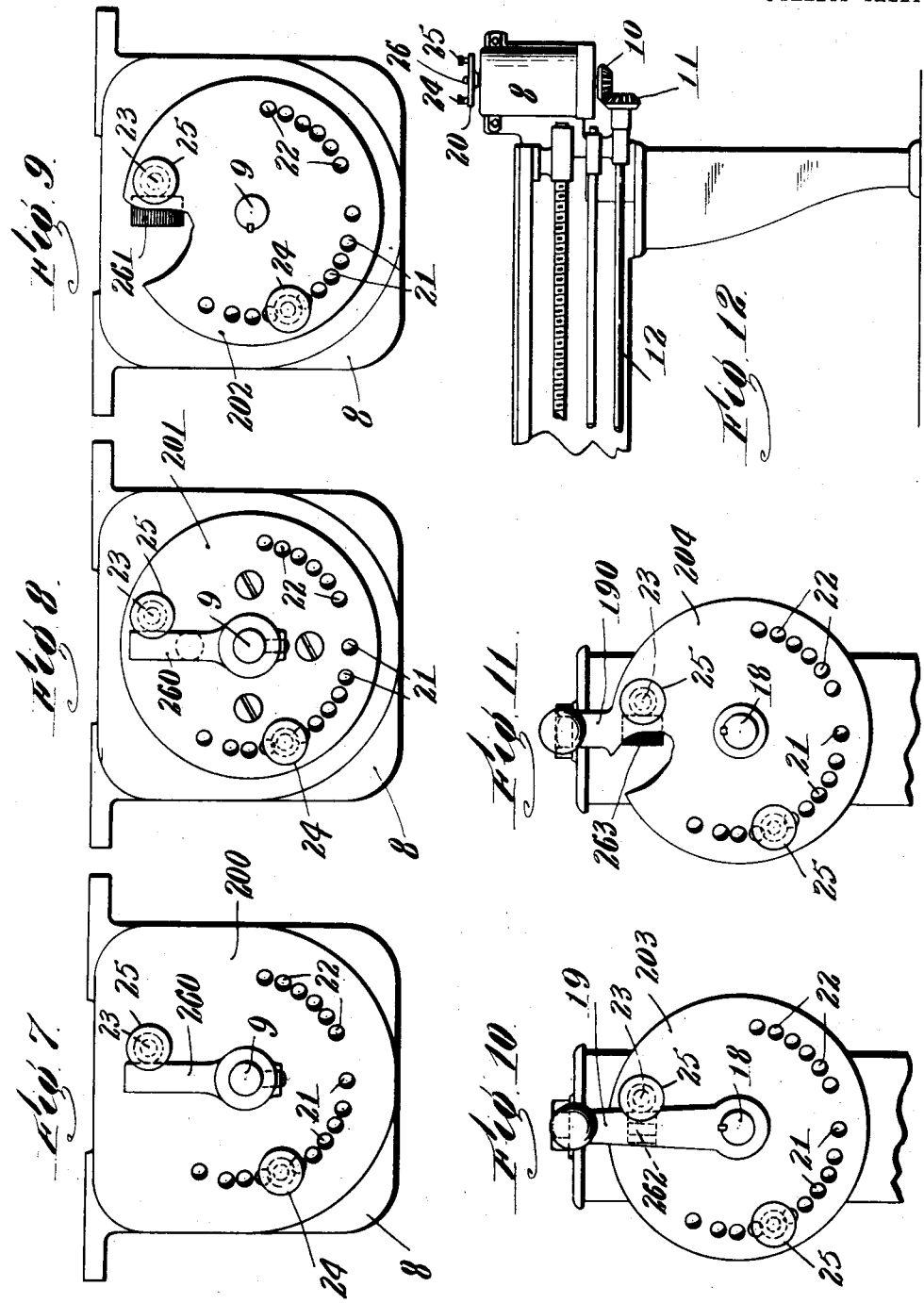

UNITED STATES PATENT OFFICE.

JOHN R. BACK, OF WORCESTER, MASSACHUSETTS, ASSIGNOR TO F. E. REED CO., OF WORCESTER, MASSACHUSETTS, A CORPORATION OF MASSACHUSETTS.

CONTROLLER FOR ELECTRICALLY-OPERATED MACHINE-TOOLS.

No. 871,199.　　　Specification of Letters Patent.　　　Patented Nov. 19, 1907.

Application filed May 1, 1906, Serial No. 314,648. Renewed September 30, 1907. Serial No. 395,184.

*To all whom it may concern:*

Be it known that I, JOHN R. BACK, a citizen of the United States, residing at Worcester, in the county of Worcester and State of Massachusetts, have invented a new and useful Controller for Electrically-Operated Machine-Tools, of which the following is a specification.

My invention relates to a controlling device for motor-operated machine tools.

The principal object of the invention is to provide a motor-operated engine lathe or other machine tool, with means adapted to be so set that the only operation necessary for the operator to perform is to turn a controller handle back and forth, its motion being limited by adjustable stops or the like, to cause the machine to operate at any predetermined speed during the cutting operation and then be stopped or reversed at a predetermined speed. By providing means for accomplishing these results, it is possible to employ unskilled labor for operating machines of this character, the foreman or overseer setting the machine and leaving the operator nothing to do but turn the controlling handle, eliminating the danger of burning out the insulation, running the speed too high, reversing the machine when it is merely desired to stop it, or making any other errors of a similar character.

The means which I have provided for accomplishing these results is very simple and of a character not likely to easily be deranged in operation.

Reference is to be had to the accompanying drawings in which,

Figure 1 is a side elevation of an engine lathe provided with a device that constitutes one embodiment of my invention. Fig. 2 is a side elevation of a controller box shown in Fig. 1. Fig. 3 is an elevation of a controller gear box adapted to be connected with the controller box shown in Fig. 2. Fig. 4 is a plan of the parts as shown in Fig. 2. Fig. 5 is a plan of parts shown in Fig. 3. Fig. 6 is a fragmentary detailed view of a stationary stop which can be employed. Fig. 7 is a plan of a controller box constructed in accordance with the principles of my invention and showing a modification. Fig. 8 is a similar view showing another modification. Fig. 9 is a plan of still another modification. Fig. 10 is a plan of a modification in which the controller handle and regulating device are more closely associated. Fig. 11 is a plan of another modification similar to Fig. 10, and Fig. 12 is a fragmentary elevation showing one way in which the device can be applied at the other end of the machine.

Figs. 1 to 6, inclusive, represent one form of the invention as applied to an engine lathe of any ordinary construction which is operated by an electric motor or the like, the power to be transmitted from the motor to the lathe and consequently the speed of operation of the lathe, being regulated by a controller 8. In this form, the controller is provided with a main shaft 9 on the lower end of which is a beveled gear 10 meshing with a gear 11 on a shaft 12. This shaft carries a gear 13 meshing with a gear 14 on a shaft 15 which, through gears 16 and 17 receives motion from a shaft 18 which is provided with an operating handle 19. Whether the handle 19 is connected with the controller shaft 9 in the manner illustrated or otherwise, it will be understood that the motion of this handle is designed to be transmitted to said shaft in such a way as to regulate the speed at which the lathe operates during the cutting operation or the reverse. The parts so far described may be constructed in any ordinary way in order to secure this result.

For the purpose of limiting and controlling the angular position of the main shaft 9 of the controller, I have shown the latter as provided with an adjustable stopping device comprising a disk 20 having in the present instance, three series of holes or sockets 21, 22 and 23 for the reception of two removable pins 24 and 25. A stop 26 is located in position to engage these pins and limit the motion of the disk and consequently the angular position of the controller shaft in accordance with the locations of the pins on the disk. The series of holes 21 is used for the purpose of setting the pin 24 to control the forward or cutting speed of the machine tool. The series 22 is used for the reversing or back stop, while what I have referred to as the series 23, which in the present instance consists of only one hole, is for the purpose of limiting the motion of the disk and the controller shaft in such position as to entirely turn off the power and stop the machine.

The pin 23 can be placed either in this hole or in one of the holes of the series 22, while the pin 24 is placed in one of the holes in the series 21, according to the character of work being done on the machine.

The gear box is preferably provided with a pointer 27 and a scale 28 to indicate the position in which the controller shaft is located by the handle 19. It will be seen that by placing one pin 24 in any desired one of the series of holes 21, the other pin 25 in hole 23, then turning the handle 19 to the right, the disk 20 will be rotated until the pin 24 engages the stop and the machine will run at the speed represented by the hole in which the pin 24 is located. By turning the handle to the left, the disk will be rotated in the opposite direction until pin 23 engages the other side of the stop and the power will be shut off.

In those kinds of work which require reversing like the cutting of screw-threads, the pin 25 would not be placed in the perforation 23 but in any desired one of the perforations 22, which gives a certain reversing speed.

It is to be observed that the hole 23 is spaced from the other holes such a distance as to avoid stopping the controlling handle too near the starting point. This prevents so setting the pin as to stop the controller handle in position to burn out the insulation.

It will be seen that after the pins are properly set, the work can be carried on by an unskilled operator, no judgment being required except to turn the handle when the cutting operation is finished or when it is to commence.

In the remaining figures, certain modifications are illustrated in which the same principles can be carried out.

Fig. 7 shows the disk 200 in which the several sets of perforations are located, as integral with the top of the controller box, a stop 260 being mounted on and fixed to the controller shaft. Fig. 8 shows the same stop, the perforation being located in a disk 201 secured to the top of the controller box.

Fig. 9 shows a disk 202 keyed to the controller shaft while the stop comprises a lug 261 mounted on the top of the controller box.

In Fig. 10 a disk 203 is mounted on the gear box in fixed position and the handle 19 carries the stop 262.

Fig. 11 shows a disk 204 and handle 190 in one piece, the stop 263 being on the gear box casing.

Fig. 12 shows the controller and corresponding parts placed on the other end of the lathe.

Upon consideration of the modifications which have been described above, it will be readily understood that my improvements are capable of being carried out in a large number of ways without departing from the scope of the invention as expressed in the claims. The invention is not limited to any or all of the particular forms illustrated, and is applicable to other forms of machine tools than the particular one shown in the drawings.

Having thus fully described my invention, what I claim and desire to secure by Letters-Patent is:—

1. The combination with an electrically operated tool, of a controller therefor having an adjustable stopping device for regulating the speed at which the tool is operated comprising a plate having perforations, pins adapted to be inserted in said perforations, and a stop for engaging the pins, a shaft for operating said stopping device, and a controller handle connected with said shaft.

2. The combination with a machine tool, of a motor for operating said tool, a controller for the motor having a stop, and an adjustable stopping device for said stop to regulate the position of the stop and the speed at which the motor will operate the tool comprising a plate having perforations, pins adapted to be inserted in said perforations, and a stop for engaging the pins, said stopping device comprising a shaft connected with the controller, and a handle connected with the shaft.

3. The combination with a motor operated machine tool and a controller therefor having a main shaft, and adjustable means for limiting the position of the shaft, of a shaft for operating said main shaft, a controller-handle, and a shaft on which said handle is mounted operatively connected with the second shaft.

4. The combination of a motor operated machine tool with a controller therefor having a main shaft, adjustable means for limiting the position of the shaft during the cutting operation, removable means for stopping the reverse motion of the shaft in such position as to turn off the power, a shaft for operating said main shaft, a controller handle, and a shaft on which said handle is mounted operatively connected with the second shaft.

5. The combination with a motor operated machine tool, of a controller therefor having a main shaft, adjustable means for limiting the position of the shaft during the cutting operation, adjustable means for limiting the position of the shaft during the reverse, a shaft for operating said main shaft, a handle, and a shaft on which said handle is mounted operatively connected with the second shaft.

6. The combination with a machine tool of a controller therefor having a main controller shaft, a stop and a disk, said stop and disk being movable relatively to each other, said disk having a pin capable of being located at a plurality of points for limiting the relative motion of the disk and stop and determining the position of the controller shaft and the speed of operation of the tool.

7. A controller for a machine tool, comprising a main shaft, a disk and a stop, the disk and stop being movable relatively to each other, said disk having a pin adjustably located thereon and adapted to engage the stop, and a removable pin for limiting the relative motion of the disk and stop in position to turn off the power.

8. A controller for machine tools, comprising a main controller shaft, a disk and a stop, said disk and stop being movable relatively to each other and one of them being connected with said shaft, said disk being provided with an adjustable pin for limiting the relative motion of the disk and stop and determining the speed transmitted by the controller during the cutting operation of the machine tool, and a second pin adjustably located on the disk for determining the speed during the reverse.

9. In a controller for machine tools and the like, the combination of a controller shaft, means for turning said shaft, a disk, a stop, said disk and stop being movable relatively to each other and one of them being connected with said shaft, said disk being provided with a series of sockets or perforations, and a pin adapted to be mounted in said sockets or perforations and in position to engage said stop.

10. A controller for machine tools and the like, comprising a main controller shaft, a disk having three series of sockets or perforations, two pins adapted to be mounted in said sockets or perforations, and a stop located in position to engage said pins, the position of said disk with respect to the stop controlling the position of the controller shaft.

11. A controller for machine tools and the like, comprising a main controller shaft, a disk having three series of sockets or perforations, two pins adapted to be mounted in said sockets or perforations, and a stop located in position to engage said pins, the position of said disk with respect to the stop controlling the position of the controller shaft, one of said series of sockets being spaced from the others and located in position to cause the power to be turned off when the stop is in contact with a pin therein.

12. A controller for electric motors having in combination with a stop a relatively movable disk having pin-holes, and a pin adapted to be mounted in any of the pin-holes for engaging the stop.

13. A controller for electric motors having in combination with adjustable pins a stop adapted to limit the relative motion of the stop and pins in forward and reverse positions.

14. The combination with a motor-operated machine tool, of a controller therefor comprising a center shaft, a plate fixed thereon and having holes therein, the position of the holes being determined by the number of revolutions desired on the forward and reverse speeds and by the position of the center shaft necessary to stop the motor, two movable pins adapted to be fitted in the holes in said plate, and a fixed stop adapted to contact with said pins and to stop the center shaft in position to reverse or stop the motor.

In testimony whereof I have hereunto set my hand, in the presence of two subscribing witnesses.

JOHN R. BACK.

Witnesses:
ALBERT E. FAY,
J. ELMER HALL.